United States Patent [19]

Patterson et al.

[11] Patent Number: 4,521,574

[45] Date of Patent: Jun. 4, 1985

[54] INCORPORATION OF FUNCTIONALIZED MONOMERS

[75] Inventors: Dennis B. Patterson, Akron; Dane K. Parker, Massillon; Lloyd D. Hess, Jr., Cuyahoga Falls, all of Ohio

[73] Assignee: The Goodyear Tire & Rubber Company, Akron, Ohio

[21] Appl. No.: 584,054

[22] Filed: Feb. 27, 1984

[51] Int. Cl.³ ................................................ C08F 2/26
[52] U.S. Cl. .................................... 526/204; 526/206; 526/289; 526/307; 526/312
[58] Field of Search ................................. 526/204, 206

[56] References Cited

U.S. PATENT DOCUMENTS 4,200,720 4/1980 Evani ................................... 526/204
4,262,101 4/1981 Hartwimmer ....................... 526/206

Primary Examiner—Christopher A. Henderson
Attorney, Agent, or Firm—D. O. Nickey

[57] ABSTRACT

A process for the emulsion copolymerization of functionalized monomers wherein the improvement comprises the use of dichloromethane or tetrahydrofuran as a cosolvent and elevated soap levels in the polymerization.

8 Claims, No Drawings

INCORPORATION OF FUNCTIONALIZED MONOMERS

TECHNICAL FIELD

This invention is concerned with the copolymerization of functionalized monomers. It has been discovered that use of dichloromethane (DCM) and/or tetrahydrofuran (THF) as cosolvents and elevated soap levels in an emulsion polymerization provides for high levels of incorporation of functionalized monomers into a polymer.

BACKGROUND OF THE INVENTION

One approach to the utilization of polymer-bound rubber chemicals is to prepare a masterbatch rubber and then blend down to the desired level with the rubber in which the chemical is intended to function. In the case of rubbers prepared in aqueous emulsions or already existing in a latex form, the blending is preferably done at the latex stage. The blending may also be conducted in the dry rubber state using conventional mixing techniques common to the rubber industry.

There exists the need to prepare polymers with high levels of polymer-bound rubber chemicals. One route to such highly loaded polymers entails the use of copolymerizable functionalized monomers. Many copolymerizable monomers having rubber chemical functionality are polar, high melting solids which are only slightly soluble in the monomers typically employed to prepare rubbers, i.e. butadiene, isoprene, styrene or acrylonitrile. The solubility of these chemicals limits the level to which they can be copolymerized and thus the extent to which they may be utilized in the masterbatch blending technique.

U.S. Pat. Nos. 3,658,769, 3,767,628 and 4,213,892 describe the preparation of compounds such as N-(4-anilinophenyl)methacrylamide and N-(4-anilinophenyl)acrylamide and the polymerization of such compounds with typical monomers. It is apparent from these patents that the copolymerizable antioxidants could only be incorporated into the polymers at relatively modest levels which, although sufficient to confer good age resistance or oxidation protection to the rubbers, are not high enough for practical use in masterbatch blending techniques. These references disclose that a solvent such as methyl ethyl ketone or isopropyl alcohol may be required to obtain adequate solubility of the monomers as well as to solubilize other ingredients where required. The references do not suggest that use of DCM or THF in conjunction with elevated soap levels would provide for unexpectedly high levels of incorporation of functionalized monomers in emulsion polymerizations.

DISCLOSURE OF THE INVENTION

A process for the copolymerization of functionalized monomers in an emulsion polymerization, the improvement comprising the use of dichloromethane and/or tetrahydrofuran as a cosolvent with elevated levels of ionic soaps. There is also disclosed a process for preparing polymers that have attached thereto rubber chemical functionalities which comprises the emulsion polymerization of monomers with a functionalized monomer that contains polymerizable vinyl group, in the presence of a free radical, the improvement comprising the use of 40 to 80 parts of a cosolvent based on total monomer charge, selected from tetrahydrofuran and/or dichloromethane in conjunction with elevated levels of ionic soaps. Further, there is disclosed a processs for the incorporation of copolymerizable antioxidants into emulsion rubbers comprising use of a cosolvent, wherein said cosolvent is selected from the group of dichloromethane, tetrahydrofuran or combinations thereof, and wherein said copolymerizable antioxidant is selected from the group consisting of (A) amides having have the folowing structural formula:

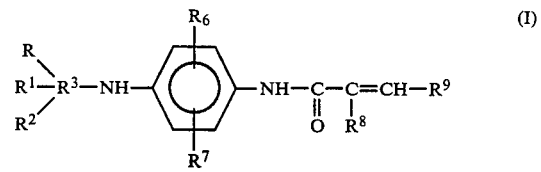

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are alkyl radicals having from 1 to 4 carbon atoms, $R^8$ is selected from the group consisting of hydrogen, methyl and ethyl; and $R^9$ is hydrogen or phenyl; and (B) imides selected from the group consisting of (1) compounds having the following structural formula:

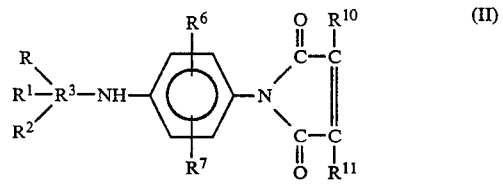

wherein R, $R^1$, $R^2$, $R^3$, $R^6$ and $R^7$ are as previously defined herein under structural Formula I and wherein $R^{10}$ and $R^{11}$ are selected from the group consisting of hydrogen and alkyl radicals having from 1 to 4 carbon atoms and (2) compounds having the following structural formula:

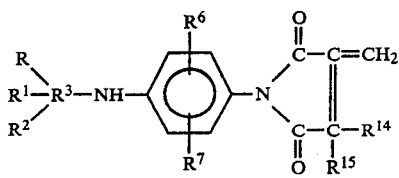

wherein R, $R^1$, $R^2$, $R^3$, $R^6$ and $R^7$ are as previously defined herein under structural Formula I and wherein $R^{14}$ and $R^{15}$ are selected from the group consisting of hydrogen and alkyl radicals having from 1 to 4 carbon atoms.

BEST MODE OF CARRYING OUT THE INVENTION

U.S. Pat. Nos. 3,658,789 and 3,767,628 herein incorporated by reference disclose various amide and imide age resisters which are copolymerized with conventional monomers in a free radical polymerization.

U.S. Pat. No. 4,213,892, also herein incorporated by reference, discloses a process for preparing oxidatively stable polymers which comprises reacting the polymer with an antioxidant in the presence of a free radical. We have unexpectedly found that use of the DCM and/or THF as cosolvents in an emulsion polymerization and in conjunction with elevated levels of ionic soaps will provide for higher levels of incorporation of the functionalized monomer.

The use of cosolvents such as dichloromethane and/or tetrahydrofuran thus overcomes the inherent limitations of such monomers containing rubber chemical functionality and allows for incorporation at high levels in emulsion polymerizations. The DCM and/or THF may be stripped from the latex after polymerization is completed if desired.

Conventional emulsion recipes are employed with the present invention, however, some restrictions and modifications arise either from the cosolvent, the copolymerizable rubber chemical (functionalized monomer) itself, or the polymerization parameters. Ionic surfactants, known in the art, such as sulfonate detergents or carboxylate soaps are useful in the instant invention.

Nonionic surfactants such as polyethers fail to form emulsions in the presence of the cosolvents and thus are unsuitable in the process of the present invention.

The level of surfactant or soap is computed based upon the total of the organic components (monomers plus cosolvents) and ranges from 8 to 30 parts ionic soap per 100 parts of organic components with 10-25 parts being more preferred and 10-15 parts being most preferred. Those skilled in the art will appreciate that these levels are higher than usually used.

Free radical initiators known in the art are useful in the instant invention, however, initiators which are strong oxidizing agents, such as persulfates, cannot be used with certain functionalized monomers, i.e. those functionalized monomers that contain moieties which are readily oxidizable.

The applicant has found that hot polymerization recipes, 50° to 100° C., are preferred over cold ones, −10° to 15° C. Preferably the polymerization is carried out to complete monomer conversion in order to incorporate essentially all of the functionalized monomer. Incremental addition, or the use of high levels of a chain transfer agent may be necessary in order to avoid excessive gel formation. Incremental addition of the comonomer(s) may be necessary for complete incorporation of the functionalized monomer. Such minor modifications are within the skill of the artisan.

Through the process of the instant invention high level incorporation of numerous functionalities can be accomplished. Thus, polymers can be prepared which have high levels of covalently bonded functionalities. Representative of the functionalities that can be incorporated into a polymer include accelerators, metal deactivators, photosensitizers, pigments, synergists, catalysts and antioxidants, or combinations thereof.

Representative of functionalized monomers that can be copolymerized to high levels through the process of the instant invention include antioxidants such as:

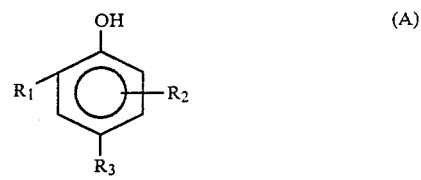

wherein $R_1$ and $R_2$ are tert-alkyl radicals from 4 to 8 carbon atoms, $R_3$ is selected from the group of radicals:

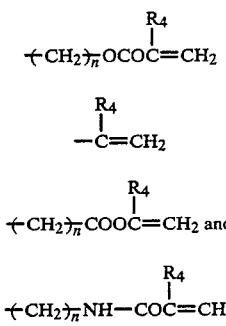

wherein $R_4$ is hydrogen or methyl and n is 0 to 3; and compounds such as:

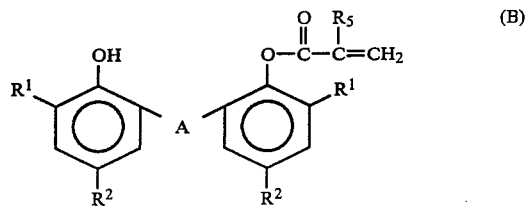

wherein $R^1$ and $R^2$ are selected from n-alkyl radicals from 1–18 carbons and secondary alkyl radicals from 3–18 carbon atoms, and t-alkyl radicals from 4–8 carbon atoms; $R^5$ is H, $CH_3$ or $C_2H_5$ and A is selected from the radicals:

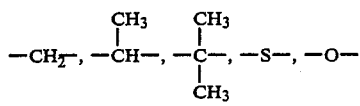

and compounds such as:

(C) 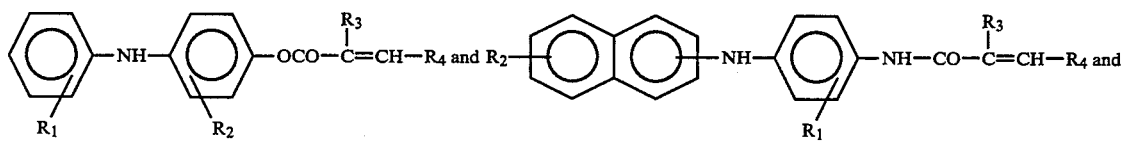

(D) 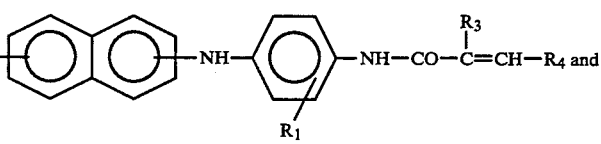

(E) 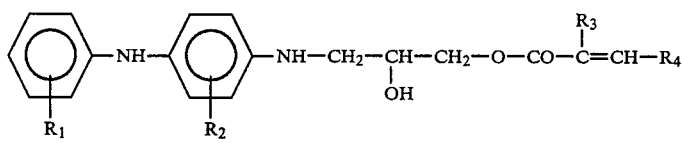

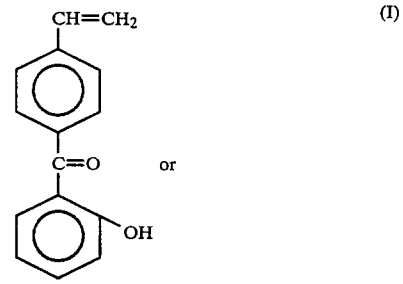

where each of $R_1$ and $R_2$ are alkyl radicals of 1 to 4 carbon atoms, $R_3$ is hydrogen or methyl and $R_4$ is H or phenyl.

Other functionalized monomers useful in the instant invention include synergists such as:

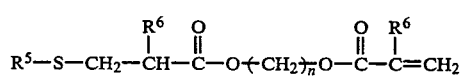 (F)

wherein $R^5$ is alkyl, aryl or substituted phenyl; $R^6$ may be independently hydrogen, methyl, ethyl or phenyl radicals, and n is 1 to 10 and compounds such as:

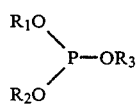 (G)

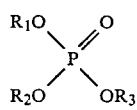

wherein $R_1$, $R_2$, and $R_3$ are selected from alkyl radicals of 1 to 20 carbon atoms, aralkyl of 7 to 20 carbon atoms, aryl of 7 to 20 carbon atoms and alkylene of 2 to 20 carbon atoms with proviso that one of the R groups contains a polymerizable vinyl group, for example a compound such as:

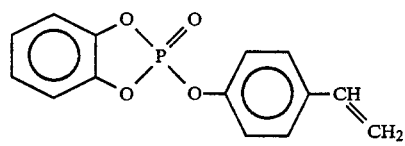 (H)

is useful in the instant invention. Suitable unsaturated UV screening agents such as:

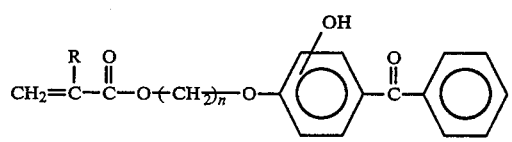 (I)

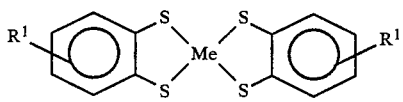

can be used in the present invention. Unsaturated triplet quenching agents such as:

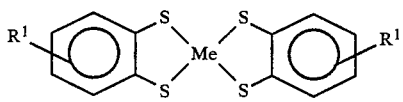 (J)

wherein Me is selected from Ni, Co and Pd and $R^1$ is a hydrocarbon radical that contains a polymerizable vinyl group, are useful in the instant invention.

The aforementioned functionalized monomers may be polymerized by well known free radical polymerization techniques with one or more comonomers that are known to polymerize in free radical initiated polymerization systems. The polymerizations may be carried out in emulsion or suspension type systems. Some adjustments in the polymerization recipe and/or reaction conditions may be necessary to obtain a satisfactory rate of polymer formation, depending on the amount of functionalized monomer included and the other monomers involved. These adjustments should be minimal when using the process of the instant invention and would be within the skill of the artisan.

Examples of free radical initiators that are useful in the practice of this invention are those known as "Redox" initiators, such as appropriate combinations of chelated iron salts, sodium formaldehyde sulfoxylate and organic hydroperoxides such as cumene and paramenthane hydroperoxides. "Azo" initiators such as azobisisobutyronitrile are preferred.

Examples of comonomers that are useful in the practice of this invention are conjugated diene monomers such as butadiene-1,3; 2-chlorobutadiene-1,3, isoprene, piperylene, and conjugated hexadienes; and vinyl monomers such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid and acrylic acid. Mixtures of the functionalized monomers and mixtures of the comonomers may be used. The monomer charge ratio is normally from about 0.10/99.9 to 100/0 functionalized monomer/comonomers. A charge ratio of about 5/95 to about 80/20 is preferred with 10/90 to 40/60 the most preferred. Ratios will vary depending on the amount of rubber chemical functionality desired to be bound and on the reactivity ratios of the monomers in the particular polymerization system used.

The present invention has particular utility in preparing polymers that have chemically bonded anti-degradants. To afford adequate protection against degradation the polymer should contain from about 0.10 part to about 10.0 parts by weight of the segmeric form of the anti-degradant per 100 parts by weight of the polymer, although from 0.50 to 5.0 parts is normally satisfactory, from 0.50 to 3.0 parts being preferred.

As the amount of bound age resister increases, the physical characteristics of the polymer are altered accordingly. Where it is desired to produce a polymer which is self stabilizing and which substantially retains the physical properties of the comonomer or comonomers, normally the polymer should contain no more than about 10.0 parts by weight of the anti-degradant segmeric unit. Such polymers preferably are solid, although they may be liquid. Where it is desired that the polymer act as a polymeric age resister which may be blended with unstabilized polymers the polymer should normally contain greater amounts of the monomeric age resister, e.g., from 10 up to 100 parts. The remainder of the polymer is comprised preferably of the segmeric form of at least one conjugated diene monomer and/or the segmeric form of at least one vinyl monomer. Preferably the polymers contain at least 50 percent by weight of the segmeric form of a conjugated diene such as butadiene-1,3 or isoprene.

The following examples exemplify the present invention and are not intended to limit the scope thereof.

EXAMPLES 1–10

A series of 1.2×10⁻⁴m³ (four ounce) bottles were charged with the following per 100 parts by weight of total monomers (styrene plus butadiene plus functionalized monomer). Total monomer charge was 12.5 g.
water: 385 parts
trisodium phosphate: 0.5 parts
azobisisobutyronitrile: 1.5 parts
tert-dodecylmercaptan: 1.0 parts Table I sets out the levels of the monomers, cosolvent and soap added to the bottles in parts per hundred based on total monomers. The functionalized monomer was the monomeric antioxidant N-(4-anilinophenyl)methacrylamide.

TABLE I

| Example | Antioxidant | Styrene | Butadiene | DCM | Soap* |
|---------|-------------|---------|-----------|-----|-------|
| 1 | 5 | 20 | 75 | 60 | 16 |

TABLE I-continued

| Example | Antioxidant | Styrene | Butadiene | DCM | Soap* |
|---------|-------------|---------|-----------|-----|-------|
| 2 | 10 | 15 | 75 | 60 | 16 |
| 3 | 15 | 10 | 75 | 60 | 16 |
| 4 | 20 | 5 | 75 | 60 | 16 |
| 5 | 25 | 0 | 75 | 60 | 16 |
| 6 | 30 | 0 | 70 | 70 | 17.5 |
| 7 | 35 | 0 | 65 | 70 | 17.5 |
| 8 | 40 | 0 | 60 | 80 | 20 |
| 9 | 45 | 0 | 55 | 80 | 20 |
| 10 | 50 | 0 | 50 | 80 | 20 |

*sodium dodecylbenzenesulfonate

The bottles were tumbled in a water bath at 60° C. for 15½ hours, which resulted in 95% or greater monomer conversion.

EVALUATION OF POLYMER LATICES PREPARED IN EXAMPLES 1–10

Portions of each latex sample were coagulated in methanol, redissolved in dichloromethane and reprecipitated from methanol. The reprecipitated polymers were analyzed for elemental nitrogen to determine the precise level of antioxidant incoporation. Table II sets out the parts of antioxidant and DCM charged to the reactor, the percent conversion of monomers and the calculated parts of antioxidant bound to the polymer.

TABLE II

| Example Polymer | Parts (AO) Charged | Parts DCM Charged | % Conv. | % N by Wt | Calc. Parts Bound A.O. |
|---------|---------|---------|---------|---------|---------|
| 1 | 5 | 60 | 100 | 0.55 | 5.0 |
| 2 | 10 | 60 | 100 | 0.99 | 8.9 |
| 3 | 15 | 60 | 99 | 1.55 | 14.0 |
| 4 | 20 | 60 | 100 | 1.98 | 17.8 |
| 5 | 25 | 60 | 99 | 2.50 | 22.5 |
| 6 | 30 | 70 | 100 | 3.34 | 30.1 |
| 7 | 35 | 70 | 100 | 3.71 | 33.4 |
| 8 | 40 | 80 | 97 | 4.15 | 37.4 |
| 9 | 45 | 80 | 96 | 4.81 | 43.3 |
| 10 | 50 | 80 | 98 | 5.30 | 47.7 |

AO = antioxidant = N—(4-anilinophenyl)methacrylamide
DCM = dichloromethane

The nitrogen analyzed copolymers from Table II containing from five to almost fifty parts of bound antioxidant were used to devise an infrared spectral screening technique for rapidly determining the antioxidant content of other copolymers. It was found that distinctive bands for both the antioxidant (1510 cm⁻¹ CNH Bending) and the butadiene (685 cm⁻¹ cis - CH Wag) gave a ratio of transmission absorbance, Antioxidant-/Butadiene (A/B) that varied proportionally to the antioxidant content provided the butadiene content remained constant. These ratios (A/B) when plotted against the known parts levels of antioxidant obtained independently from nitrogen analysis produce a secondary calibration chart from which the parts of antioxidant in an unknown sample can be rapidly determined by IR determination of its A/B ratio.

The data in Table II indicates that the instant invention provides a method for the virtually quantitative incorporation of a functionalized monomer.

For the oxygen absorption study and masterbatch technique each of the ten analyzed latices was diluted with the appropriate amount of production SBR latex (containing no antioxidant and 20.5% solids) to yield a latex blend containing 1.25 parts by weight of polymer-bound antioxidant per 100 parts of rubber. (Samples 1-10). Samples 11 and 12 of Table III are Example Polymers 1 and 10 of Table I, respectively, diluted to 1.0 parts of polymer bound antioxidant per 100 parts of rubber. The mixed latices were blended by rolling in a sample bottle. Sample 13 of Table III is a control which contains 1.25 parts of the commercially accepted antioxidant, Wingstay TM 100 (reaction product of hydroquinone, aniline and o-toluidine). Sample 14 of Table III is a control which contains 1.25 parts of N-(4-anilinophenyl) methacrylamide blended (physical admixture) with the latex.

The blends for samples 1-14 were each coagulated in 400 ml. isopropanol and the polymer crum air dried to give $\approx 10$ grams of dried polymer. Toluene cements were prepared, using three grams of each polymer. Duplicate samples were prepared from each cement by splitting the cement between two preweighed aluminum trays. The resulting films after solvent evaporation and weighing were placed in an oxygen absorption apparatus. The amount of time required for the sample to absorb 1% of its weight in oxygen at 100° C. is taken as a measure of relative oxidation resistance. The testing procedure is described in further detail in *Industrial and Engineering Chemistry*, 43, 456 (1951) and *Industrial and Engineering Chemistry*, 45, 392 (1953). See Table III for results.

TABLE III

Latex Blends
Oxygen Absorption Results

| Sample | Hrs. to 1% $O_2$ at 100° C. (Avg. 2 samples) |
|---|---|
| 1 | 444 |
| 2 | 326 |
| 3 | 457 |
| 4 | 507 |
| 5 | 314 |
| 6 | 480 |
| 7 | 457 |
| 8 | 441 |
| 9 | 404 |
| 10 | 259 |
| 11* | 241 |
| 12* | 130 |
| 13** | 266 |
| 14** | 241 |

*Blended sample to 1.0 parts.
**Controls

Sample 12 demonstrated substantially inferior $O_2$ absorption data which it is believed is due to the incompatability of the highly loaded polymer with SBR.

COMPARATIVE EXAMPLE

The procedure and charge of Example 8 was repeated with the exception that methyl ethyl ketone (MEK) was substituted for the DMC. The hot polymerization yielded phase separation which is verey undesirable. Analysis indicated 3.4% nitrogen in the polymer. This is to be contrasted with Example Polymer 8 from Table II with DCM as the cosolvent wherein 4.15% nitrogen was found and there was no phase separation. Thus, with DCM as the cosolvent 94% of the functionalized monomer was incorporated contrasted with 77% incorporation with MEK.

EXAMPLE 11

A 0.019 $m^3$ (five gallon) glass-lined steel reactor was charged with:
water: 400 parts trisodium phosphate: 0.5 parts
sodium dodecylbenzenesulfonate: 16 parts
Parts by weight based on a total monomer charge of 5 lbs.

The reactor was sealed and flushed with nitrogen. 20 parts of N-(4-anilinophenyl)methacrylamide was dissolved in 60 parts of DCM, then 5 parts styrene, 1.5 parts of azobisisobutyronitrile and 0.4 parts of t-dodecylmercaptan were dissolved in the DCM solution. The solution was then charged to the reactor. 75 parts of butadiene was charged to the reactor and the contents heated to 60° C. with stirring. After 3 hours, a solids determination indicated 55 percent conversion. An additional 0.3 parts of t-dodecylmercaptan was added. Stirring at 60° C. was continued for a total of 13 hours resulting in essentially complete monomer conversion.

EXAMPLES 12 and 13

A series of $1.2 \times 10^{-4} m^3$ (four oz.) bottles were run with the following charge per 100 parts by weight of total monomers (12.5 gms).

| | Example 12 | Example 13 |
|---|---|---|
| water | 385.0 | 385.0 |
| azobisisobutyronitrile | 1.5 | 1.5 |
| tert-dodecylmercaptan | 1.0 | 1.0 |
| sodium dodecylbenzenesulfonate | 16.0 | 16.0 |
| dichloromethane | 60.0 | 60.0 |
| butadiene | 67.5 | 60.0 |
| styrene | 22.5 | 20.0 |
| Compound A* synergist | 10.0 | 10.0 |
| Compound B** antioxidant | — | 10.0 |

*Compound A:

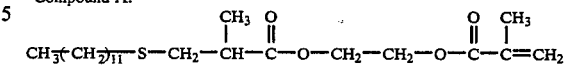

**Compound B:

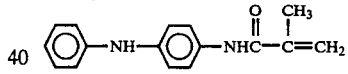

Polymerizations were run for 23 hours at 60° C., resulting in essentially complete monomer conversion. Polymers were precipitated by slow dropwise addition of the latices into excess isopropanol. Small amounts of the polymers were redissolved and reprecipitated in alcohol to remove traces of nonpolymerized materials. Analysis of the polymers was accomplished by IR of thin films cast on KBr plates from dichloromethane solution and elemental analysis.

IR spectra had a characteristic ester carbonyl absorption for incorporated Compound A at 1740 $cm^{-1}$, whereas the polymer containing Compound B had a characteristic amide-carbonyl absorption at 1640 $cm^{-1}$.

Elemental analysis for % S by weight of Example 12 and % S and % N by weight of Example 13 show very high levels of incorporation. See Table IV.

TABLE IV

| Analysis of Examples 12 and 13 | | |
|---|---|---|
| | Calculated* | Found |
| Polymer from Example 15 % S by weight | 0.87 | 0.83 |
| Polymer from Example 16 | | |
| % S by weight | 0.87 | 0.84 |
| % N by weight | 1.11 | 1.15 |

*For complete incorporation

EXAMPLES 14 and 15

Examples 14 and 15 correspond, respectively, to Examples 4 and 8 of Table I except that isoprene was substituted for butadiene and, in Example 14, no styrene was used, 80 parts of isoprene being used instead, and 20 parts of soap was used in both Examples. Otherwise the amounts and components were as in the respective earlier Examples. The polymerization time was 25 hours and solids measurements indicated essentially complete volatile monomer conversion. The polymers were isolated as in Examples 1–10 and analyzed for elemental nitrogen to determine the bound antioxidant content.

TABLE V

| Example | Parts AO Charged | Wt. % N | Calc. Parts Bound AO |
| --- | --- | --- | --- |
| 14 | 20 | 1.40 | 12.7 |
| 15 | 40 | 2.93 | 26.3 |

EXAMPLE 16

Use of the THF and DCM as cosolvents

A $1.2 \times 10^{-4} m^3$ (four once) bottle was charged with the following per 100 parts by weight of total monomers (butadiene plus antioxidant), with a total monomer charge of 12.5g.
  water: 385 parts
  trisodium phosphate: 0.5 parts
  azobisisobutyronitrile: 1.5 parts
  tert-dodecylmercaptan: 1.0 parts
and then the following components were individually charged to the bottle.

N-(4-anilinophenyl) methacrylamide: 40 parts
Tetrahydrofuran(spectroscopic grade) (THF): 40 parts
Dichloromethane (DCM): 40 parts The bottle was flushed with nitrogen prior to the addition of the THF and DCM. The bottle was then chilled to $-10°$ C. and then 60 parts of butadiene was charged to the bottle.

The bottle was then warmed to room temperature and was placed in a 60° C. rotary bath for 22.5 hours. The bottle contained a good emulsion with a small amount of sediment as found with DCM as the sole cosolvent. The bottle exhibited negative pressure, thus indicating essentially complete conversion of the butadiene. Analysis indicated that the resulting polymer contained about 40 parts of the functionalized monomer. Thus use of DCM and THF results in almost complete incorporation of the functionalized monomer as did DCM alone, see Example Polymer 8 in Table II.

Other cosolvents were evaluated, and it was determined that chloroform, tetrachloroethylene, diethyl ether, methyl isobutyl ketone, toluene, and methanol are not suitable for use in the instant invention.

EXAMPLE 17

Use of THF as the sole cosolvent

A $1.2 \times 10^{-4} m^3$ (four once) bottle was charged with the following per 100 parts by weight of total monomers (styrene, butadiene plus antioxidant), with a total monomer charge of 12.5g.
  water: 385 parts
  trisodium phosphate: 0.5 parts
  azobisisobutyronitrile: 1.0 parts
  tert-dodecylmercaptan: 0.7 parts
and then the following components were individually charged to the bottle.

N-(4-amilinophenyl)methacrylamide: 10 parts
Tetrahydrofuran: 60 parts

The bottle was flushed with nitrogen prior to addition of THF. To the bottle was then added 15 parts of styrene. The bottle was then chilled to $-10°$ C. and 75 parts of butadiene charged.

The bottle was then warmed to room temperature and was then placed in a 60° C. rotary bath for 22.5 hours. After this time period, the bottle exhibited negative pressure, thus indicating essentially complete conversion of the butadiene. Analysis of this product indicates the resulting polymer to have essentially complete incorporation of the antioxidant monomer, N-(4-anilinophenyl)methacrylamide.

EXAMPLES 18–20

Use of THF as cosolvent

The procedure as set out in Example 17 was used; however, the parts charged of the functionalized monomer and the functionalized monomer were changed. Table IV sets out the results:

TABLE VI

| Example | A.O.* | Parts A.O. | THF Parts | Conversion % | Nitrogen wt. % | Bound A.O. % |
| --- | --- | --- | --- | --- | --- | --- |
| 17 | A | 10 | 60 | 100 | 1.02 | 8.65 |
| 18 | A | 20 | 60 | 100 | 1.70 | 14.4 |
| 19 | B | 10 | 60 | 98.6 | 0.96 | 8.13 |
| 20 | B | 20 | 60 | 99.8 | 2.03 | 17.2 |

*A.O.
A - N—(4-anilinophenyl)methacrylamide
B - N—(4-anilinophenyl)acrylamide

EXAMPLES 21–22

Two $1.2 \times 10^{-4} m^3$ (four ounce) bottles were charged with the following per 100 parts by weight of total monomers. The total monomer charge was 12.5 gms.

| | |
| --- | --- |
| trisodium phosphate | 0.5 parts |
| azobisisobutyronitrile | 1.5 parts |
| water | 385.0 parts |
| sodium dodecylbenzenesulfonate | 16.0 parts |
| compound C* | 20.0 parts |
| styrene | 20.0 parts |
| cosolvent | 60.0 parts |
| t-dodecylmercaptan | 1.0 parts |
| butadiene | 60.0 parts |

*Compound C $$\text{C}_6\text{H}_5\text{—NH—C}_6\text{H}_4\text{—NH—CH}_2\text{—CH(OH)—CH}_2\text{—O—CO—C(CH}_3\text{)=CH}_2$$

Example 21 used THF as the cosolvent, whereas Example 22 used DCM. The bottles were tumbled in a rotary water bath at 60° C. for 24 hours. No butadiene pressure was detected, thus indicating essentially complete conversion of butadiene. Latices were coagulated in excess methanol to isolate the rubber. Samples 21 and 22 were then continuously extracted with hot methanol for 24 hours to remove any unpolymerized monomers. Infrared analysis of solution cast thin films of these polymers show intense absorption bonds centered at 3400 cm$^{-1}$ for the NH and OH stretch region and at 1730 cm$^{-1}$ for the ester carbonyl attributable to the antioxidant monomer. This data coupled with an almost quantitative polymer yield indicates very high incorporation of the antioxidant monomer.

INDUSTRIAL APPLICABILITY

The present invention provides a method for the high loading of polymers that can be used as masterbatches. These masterbatches can be blended with unfunctionalized polymer to achieve a final product containing appropriate amounts of the desired rubber chemical or chemicals. Industrial production of polymers having the desired amount of bound rubber chemical is not economic or practical. The functionalized monomers cause problems in production facilities and thus the instant invention provides an economic and efficient method wherein bound chemical functionalities can be incorporated into polymers on a commercial production scale.

While certain representative embodiments and details have been shown for the purpose of illustrating the invention, it will be apparent to those skilled in this art that various changes and modifications may be made therein without departing from the scope of the invention.

We claim:

1. A process for forming a polymer comprising the aqueous emulsion polymerization of:
   (A) at least one functionalized monomer that contains a polymerizable vinyl group; with
   (B) at least one copolymerizable conjugated diene monomer selected from the group consisting of butadiene-1,3, 2-chlorobutadiene-1,3, isoprene, piperylene and conjugated hexadienes; and optionally
   (C) at least one vinyl monomer selected from the group consisting of styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid and acrylic acid;
   the ratio of functionalized monomer to conjugated diene to vinyl monomer can range from 5:75:20 to 95:5:0 parts per hundred based on total monomers;
   the improvement which comprises polymerizing the monomers in the presence of from 8 to 30 parts of an ionic soap per 100 parts of total organic components, (monomers and cosolvents) and 40–80 parts of dichloromethane, tetrahydrofuran or combinations thereof based on 100 parts of total monomers.

2. A process according to claim 1 wherein the functionalized monomer is selected from 3-N-(4'-anilinophenyl) amino-2-hydroxypropyl methacrylate and N-(4-anilinophenyl) methacrylamide.

3. A process according to claim 1 wherein the cosolvent is tetrahydrofuran.

4. A process according to claim 1 wherein the cosolvent is dichloromethane.

5. A process according to claim 1 wherein at least one functionalized monomer is selected from the group consisting of (A) amides having the structural formula:

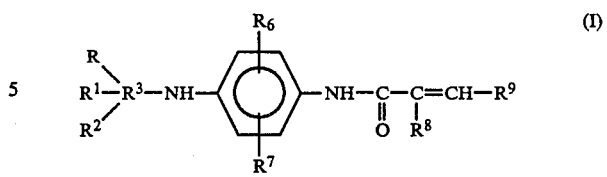

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are hydrogen or alkyl radicals having from 1 to 4 carbon atoms, $R^8$ is selected from the group consisting of hydrogen, methyl and ethyl; and $R^9$ is hydrogen or phenyl; and (B) imides selected from the group consisting of (1) compounds having the following structural formula:

wherein R, $R^1$, $R^2$, $R^3$, $R^6$ and $R^7$ are as previously defined herein under structural Formula I and wherein $R^{10}$ and $R^{11}$ are selected from the group consisting of hydrogen and alkyl radicals having from 1 to 4 carbon atoms; and (2) compounds having the following structural formula:

wherein R, $R^1$, $R^2$, $R^3$, $R^6$ and $R^7$ are as previously defined herein under structural Formula I and wherein $R^{14}$ and $R^{15}$ are selected from the group consisting of hydrogen and alkyl radicals having from 1 to 4 carbon atoms.

6. A process according to claim 1 wherein the functionalized monomer is selected from the group of compounds represented by the structural formulae:

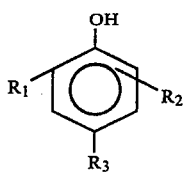
(A)

wherein $R_1$ and $R_2$ is a tert-alkyl radical from 4 to 8 carbon atoms, $R_3$ is selected from the group of radicals:

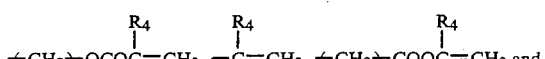

wherein $R_4$ is hydrogen or methyl and n is 0 to 3; and compounds with the structural formula:

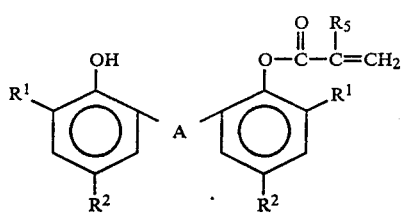
(B)

wherein $R^1$ and $R^2$ are selected from n-alkyl radicals from 1–18 carbons and secondary alkyl radicals from 3–18 carbon atoms, and t-alkyl from 4–8 carbon atoms; $R^5$ is H, $CH_3$ or $C_2H_5$ and A is selected from the radicals:

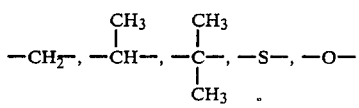

and compounds with the structural formula:

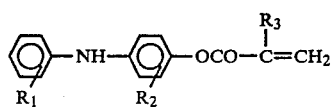
(C)

and

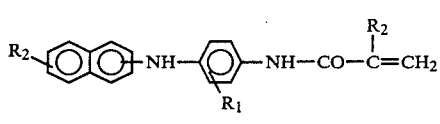
(D)

and

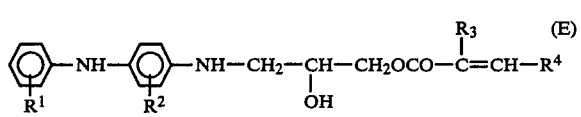
(E)

where each of $R_1$ and $R_2$ are alkyl radicals of 1 to 4 carbon atoms, $R_3$ is hydrogen or methyl, and $R^4$ is hydrogen or phenyl; and compounds with the structural formula:

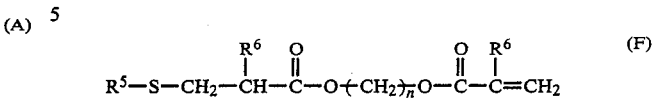
(F)

wherein $R^5$ is alkyl, aryl or substituted phenyl; $R^6$ may be independently hydrogen, methyl, ethyl or phenyl radicals, and n is 1 to 10; and compounds with the structural formula:

(G)

wherein $R_1$, $R_2$ and $R_3$ can be the same or different radicals selected from the group consisting of alkyl radicals of 1 to 20 carbon atoms, aralkyl radicals of 7 to 20 carbon atoms, aryl radicals of 7 to 20 carbon atoms and alkylene radicals of 2 to 20 carbon atoms, with the proviso that one of the R groups contain a polymerizable vinyl group; and compounds of the structural formula:

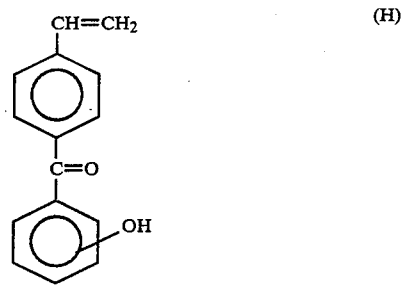
(H)

and;

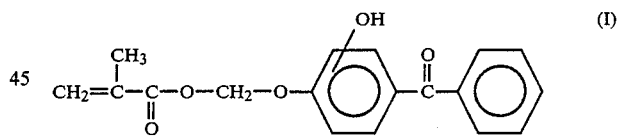
(I)

and compounds of the structural formula

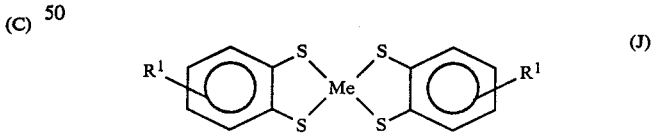
(J)

wherein $R^1$ is a hydrocarbon radical that contains a polymerizable vinyl group and Me is selected from the group consisting of nickel, cobalt and palladium.

7. A process according to claim 1 wherein the conjugated diene monomer is butadiene-1,3 and ratio of functionalized monomer to conjugated diene to vinyl monomer ranges from 15:75:10 to 50:50:0.

8. A process according to claim 1 wherein the functionalized monomer has a moiety selected from the group consisting of antioxidants, metal deactivators, photosensitizers, pigments, synergists and catalysts.

* * * * *